US011085473B2

United States Patent
Kreig et al.

(10) Patent No.: US 11,085,473 B2
(45) Date of Patent: Aug. 10, 2021

(54) METHODS AND APPARATUS FOR FORMING NODE TO PANEL JOINTS

(71) Applicant: DIVERGENT TECHNOLOGIES, INC., Los Angeles, CA (US)

(72) Inventors: William David Kreig, Huntington Beach, CA (US); Chukwubuikem Marcel Okoli, Los Angeles, CA (US); David Brian TenHouten, Los Angeles, CA (US); Antonio Bernerd Martinez, El Segundo, CA (US); Kevin Robert Czinger, Santa Monica, CA (US); Broc William TenHouten, Rancho Palos Verdes, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 736 days.

(21) Appl. No.: 15/853,301

(22) Filed: Dec. 22, 2017

(65) Prior Publication Data

US 2019/0196447 A1  Jun. 27, 2019

(51) Int. Cl.
  *F16B 11/00*  (2006.01)
  *F16B 5/12*  (2006.01)

(52) U.S. Cl.
  CPC ............ *F16B 11/006* (2013.01); *F16B 5/121* (2013.01); *Y10T 403/47* (2015.01); *Y10T 403/473* (2015.01)

(58) Field of Classification Search
  CPC .......... B22F 3/1055; B22F 5/003; B22F 5/10; B22F 7/062; B22F 2003/1057;
  (Continued)

(56) References Cited

U.S. PATENT DOCUMENTS 5,203,226 A  4/1993  Hongou et al.
5,742,385 A  4/1998  Champa
(Continued)

FOREIGN PATENT DOCUMENTS

WO  1996036455 A1  11/1996
WO  1996036525 A1  11/1996
(Continued)

OTHER PUBLICATIONS

US 9,202,136 B2, 12/2015, Schmidt et al. (withdrawn)
(Continued)

*Primary Examiner* — Josh Skroupa
(74) *Attorney, Agent, or Firm* — Arent Fox LLP

(57) ABSTRACT

A node to panel interface structure for use in a transport structure such as a vehicle is disclosed. In an aspect, the node includes a base, first and second sides protruding from the base to form a recess for receiving a panel, ports for adhesive injection and/or vacuum generation, one or more adhesive regions disposed on a surface of each side adjacent the panel, and at least one channel coupled between the first and second ports and configured to fill the adhesive regions with an adhesive, the adhesive being cured to form a node-panel interface. The node may be additively manufactured. In an exemplary embodiment, the node may use sealant features for including sealants that border and define the adhesive regions, and that may hermetically seal the region before and after adhesive injection. In another embodiment, the node may include isolation features for including isolators for inhibiting galvanic corrosion. In another aspect, adhesive may be filled serially on the adhesive regions on the first side and then on the adhesive regions on the second side. Adhesive may alternatively may be filled in parallel, or concurrently, on the adhesive regions of both sides.

26 Claims, 14 Drawing Sheets

(58) Field of Classification Search
CPC ......... B29C 65/48; B33Y 50/00; B33Y 80/00;
B62D 21/17; B62D 27/023; B62D
27/026; G05B 19/4099; G05B
2219/49023; F16B 5/121; F16B 11/006;
Y10T 403/47; Y10T 403/473
USPC .................................................. 403/265, 268
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,645,406 B2 * | 1/2010 | Kilwin ................. B29C 66/131 264/216 |
| 7,670,527 B2 * | 3/2010 | Malis ................... F16B 11/006 264/261 |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,272,618 B2 * | 9/2012 | Kilwin ................. F16B 11/006 248/473 |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |

(56) References Cited

U.S. PATENT DOCUMENTS

| | | |
|---|---|---|
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |

(56) References Cited

U.S. PATENT DOCUMENTS

| | | | |
|---|---|---|---|
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,352,345 B2 * | 7/2019 | Evans | F16B 11/006 |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2009/0100777 A1 | 4/2009 | Guillot et al. | |
| 2013/0341967 A1 | 12/2013 | Greve | |
| 2014/0241790 A1 * | 8/2014 | Woleader | F16B 11/006 403/270 |
| 2014/0277669 A1 | 9/2014 | Nardi et al. | |
| 2017/0001368 A1 | 1/2017 | Czinger et al. | |
| 2017/0097031 A1 | 4/2017 | Woleader et al. | |
| 2017/0113344 A1 | 4/2017 | Schönberg | |
| 2017/0341309 A1 | 11/2017 | Piepenbrock et al. | |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2017-100037 A1 | 6/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Notification of the First Office Action received in Chinese Patent Application No. 201822157714.X dated Nov. 6, 2019, with English Translation.
International Search Report and Written Opinion dated Mar. 8, 2019, regarding PCT/US2018/061919.

* cited by examiner

METHODS AND APPARATUS FOR FORMING NODE TO PANEL JOINTS

BACKGROUND

Field

The present disclosure relates to transport structures such as automobiles, trucks, trains, boats, aircraft, motorcycles, metro systems, and the like, and more specifically to techniques for forming node to panel connections in transport structures.

Background

A transport structure such as an automobile, truck or aircraft employs a large number of interior and exterior panels. These panels provide structure to the automobile, truck and aircraft, and respond appropriately to the many different types of forces that are generated or that result from various actions like accelerating and braking. These panels also provide support. They provide floors for positioning seats and supports for securing large and heavy components. Panels participate in providing crucial suspension characteristics for an automobile. Uniquely-shaped panels provide special aerodynamic characteristics to both high-performance automobiles and aircraft. Interior door panels and dashboard panels may provide important functions and protect the occupant during an impact event. Panels are an integral part of transport structures.

Most panels must be coupled to, or interface securely with, other panels or other structures in secure, well-designed ways. These connection types may be accomplished using specialized joint members or nodes. These joint members or nodes serve not only to attach to, interface with, and secure the panel itself, but they also may be used to couple the panel to other critical components of the automobile (e.g., another panel, an extrusion, tubes, other nodes, etc.) or to perform independent functions. Transport structures commonly use various types of node-panel joints to enable panels to interface with other structures and to accomplish the above functions.

The design and manufacture of these node-panel joint structures has been problematic in part because the joints are often specialized structures requiring intricate sub-substructures for realizing secure, durable and long-lasting bonds with a panel. It is often extremely difficult to manufacture these types of complex structures efficiently or cheaply using traditional manufacturing processes. Machining, for example, may produce high-precision parts incorporating this level of detail, but at a significant cost. Casting and other methods may not produce the same levels of precision needed for such paneling applications. In addition, conventional joints used to connect panels are often unnecessarily bulkier and made out of heavier materials than necessary in view of the manufacturing limitations above. Needless to say, bulkier and heavier structures in vehicles produce geometrical design limitations and are inefficient. Moreover, where dissimilar materials are to be connected or otherwise used together, as is often the case in various structural applications, effective connection techniques using conventional manufacturing processes are complex and often difficult to achieve. The resulting connected components may be subject to corrosion and other problems over time.

In short, more efficient, lighter-weight, node designs with greater sophistication and superior capabilities are needed for interfacing with panels to implement potentially high performance applications at manageable price points.

SUMMARY

Nodes for joining with panels in transport structures and the additive manufacture thereof will be described more fully hereinafter with reference to various illustrative aspects of the present disclosure.

In one aspect of the disclosure, a node includes a base, first and second sides protruding from the base to form a recess for receiving a panel, first and second ports, one or more adhesive regions disposed on a surface of each side adjacent the panel; and at least one channel coupled between the first and second ports and configured to fill the adhesive regions with an adhesive, the adhesive being cured to form a node-panel joint.

In another aspect of the disclosure, a method includes additively manufacturing (AM) a node comprising a base, first and second sides protruding from the base to form a panel recess, first and second ports, one or more adhesive regions disposed on an inner surface of each side, and at least one channel coupled between (i) the first port, (ii) each of the one or more adhesive regions, and (iii) the second port; and inserting a sealant around each of the one or more adhesive regions.

It will be understood that other aspects of nodes for joining with panels in transport structures and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of nodes for joining with panels in transport structures and the manufacture thereof will now be presented in the detailed description by way of example, and not by way of limitation, in the accompanying drawings, wherein.

DETAILED DESCRIPTION

Figure 1:
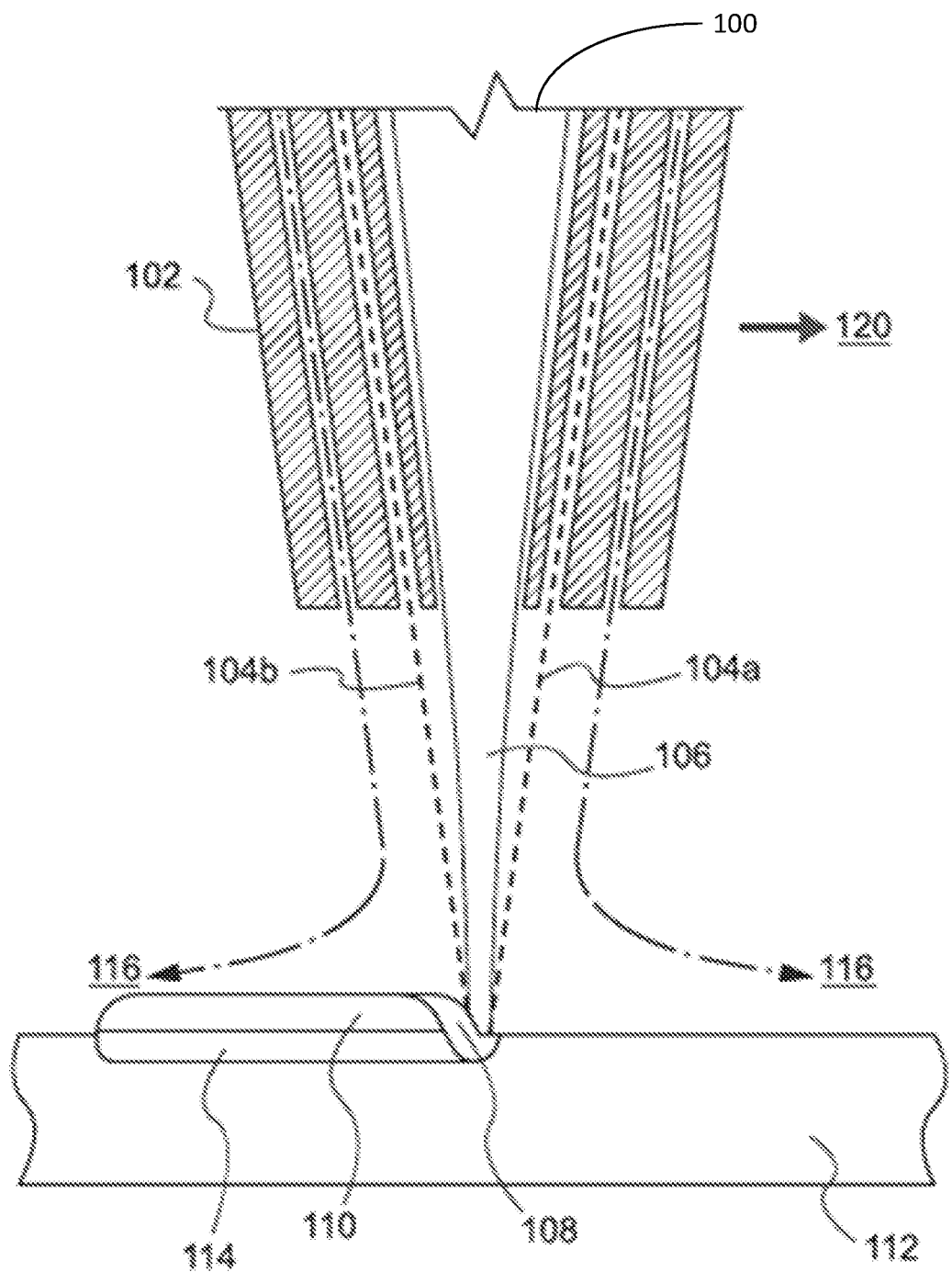
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed to the assembly and use of node-panel joints in vehicles and other transport structures. In many cases, the nodes, panels, and other structures described in this disclosure may be formed using additive manufacturing (AM) techniques, due in part to AM's innumerable advantages as articulated below. Accordingly, certain exemplary AM techniques that may be relevant to the formation of the nodes or panels described herein will initially be discussed. It should be understood, however, that numerous alternative manufacturing techniques, both additive and conventional, may instead be used in implementing the node-panel joints (in part or in whole) disclosed herein, and that the identified node-panel joints need not be limited to the specific AM techniques below.

Manufacturers that stand to benefit from the node-panel joints in this disclosure include those that manufacture virtually any mechanized form of transport, which often rely heavily on complex and labor intensive machine tools and molding techniques, and whose products often require the development of complex panels, nodes, and interconnects to be integrated with intricate machinery such as combustion engines, transmissions and increasingly sophisticated electronics. Examples of such transport structures include, among others, trucks, trains, tractors, boats, aircraft, motorcycles, busses, and the like.

Additive Manufacturing (3-D Printing).

Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
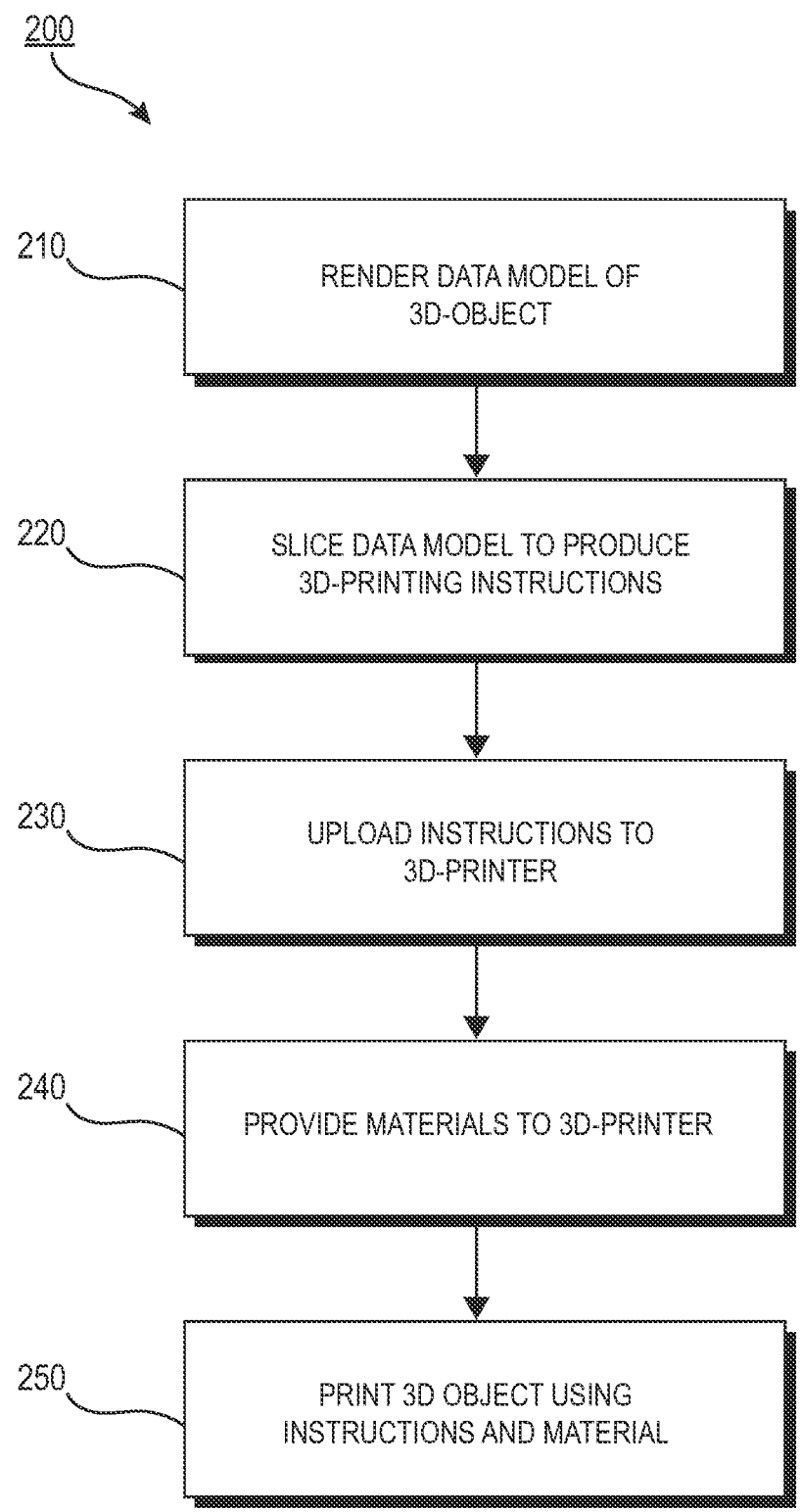
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
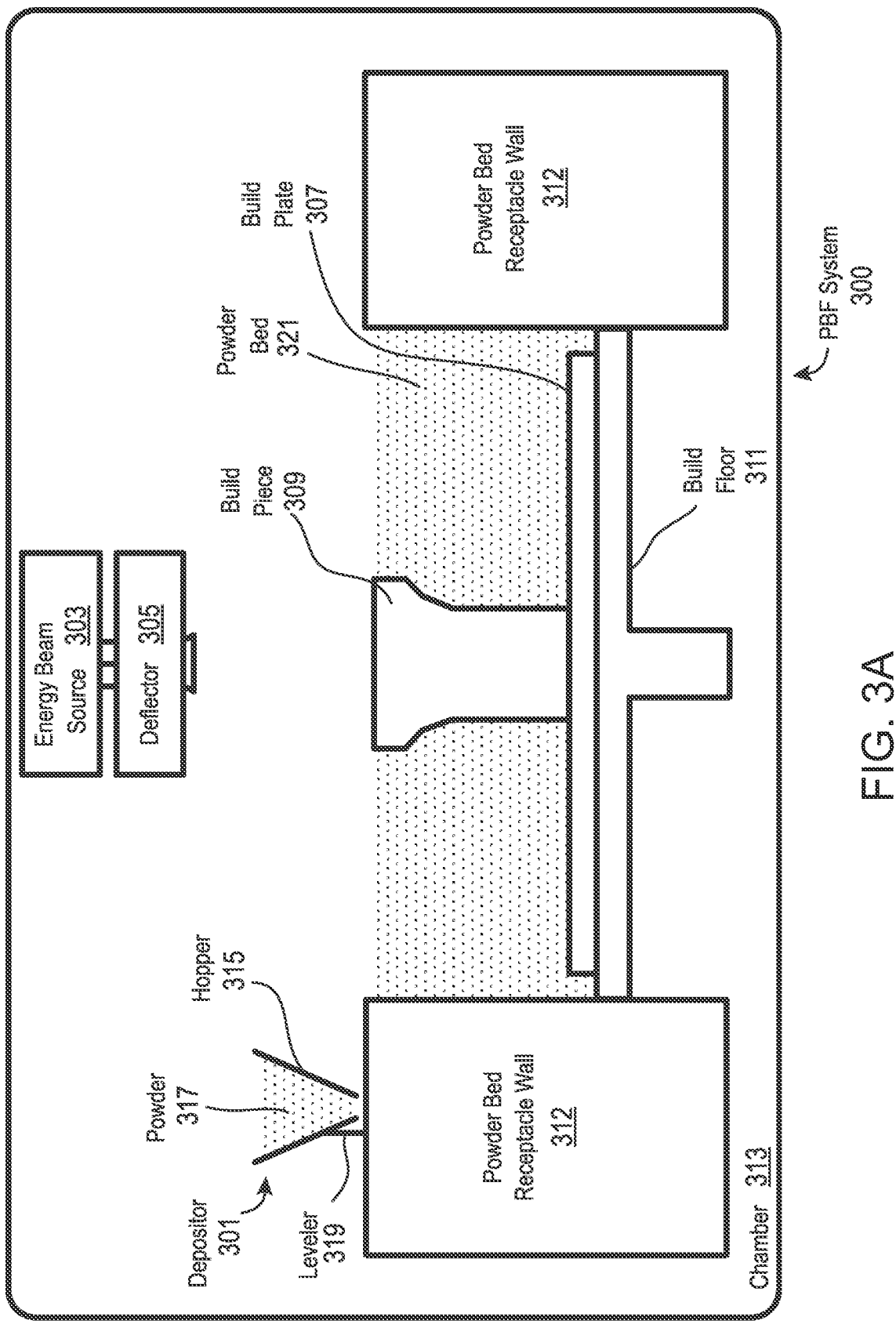
FIGS. 3A-D illustrate an exemplary powder bed fusion (PBF) system during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
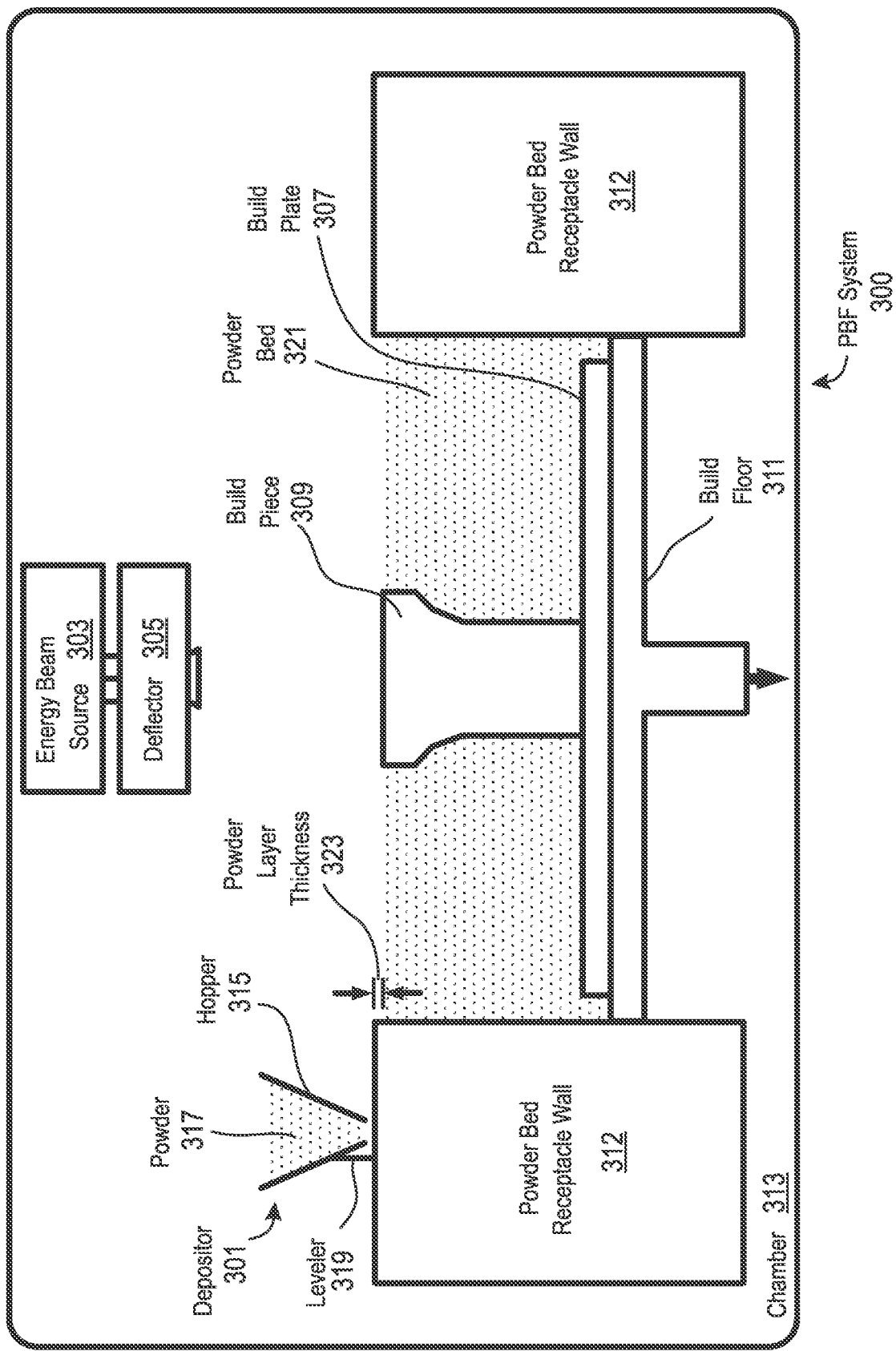

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
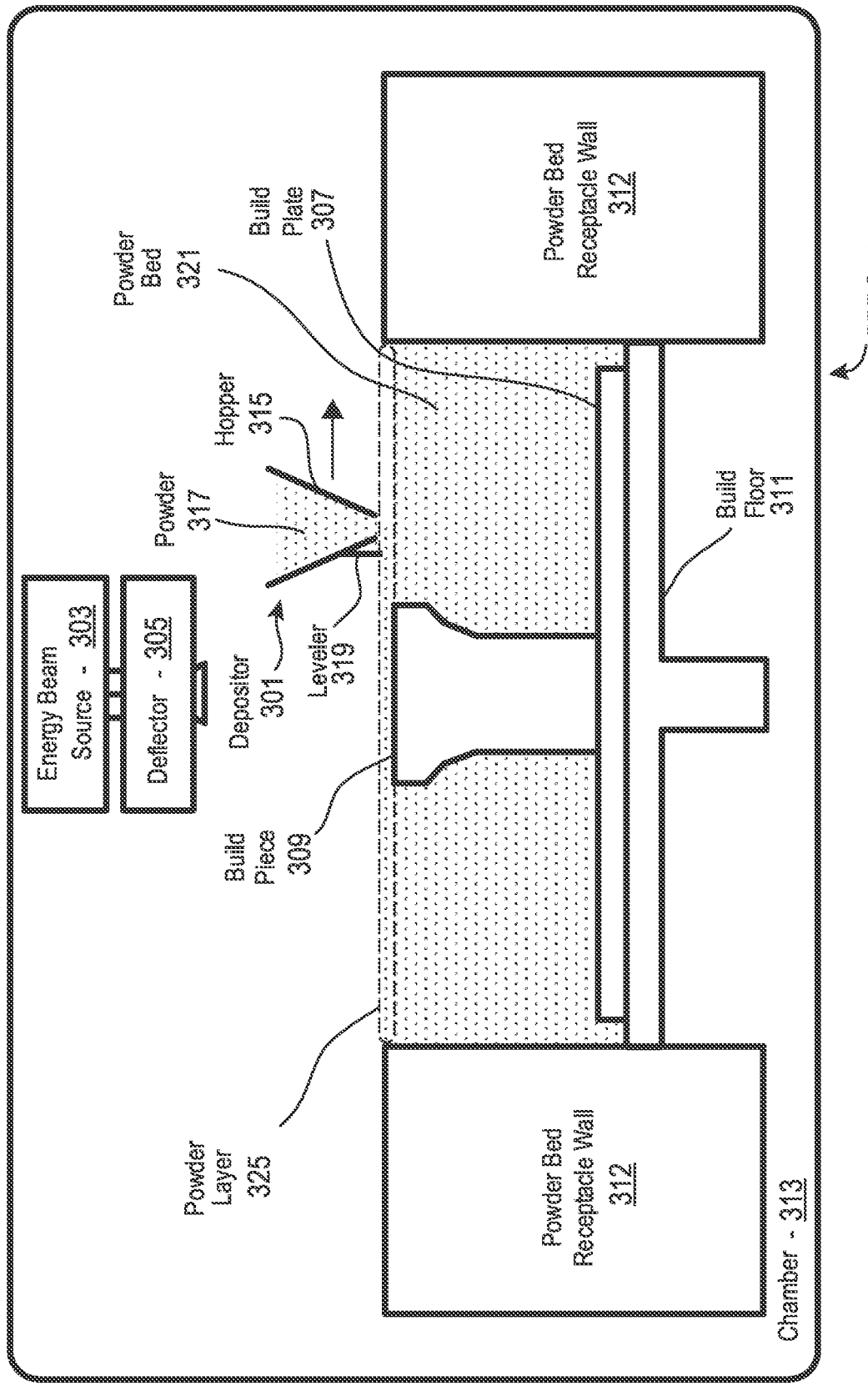

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like.

It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
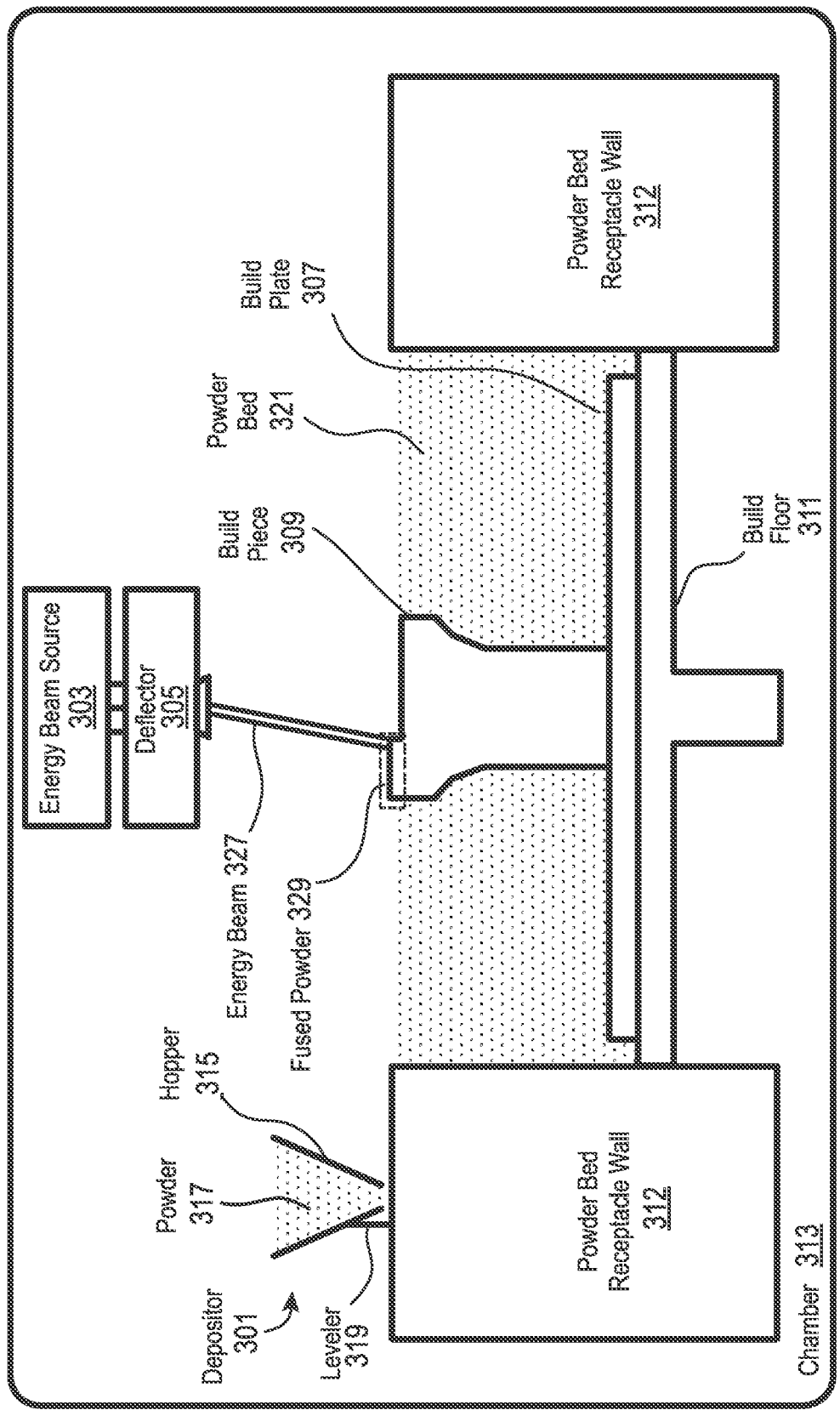

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

This disclosure presents a technique for enabling connection of additively manufactured nodes to panels, also referred to herein as node-panel connection, node-panel joint, and node-panel interface. In an embodiment, at least one node-panel connection may be a part of a vehicle chassis. This type of node-panel connection may incorporate adhesive bonding between the node and panel to realize the connection. Sealants may be used to provide adhesive regions for adhesive injection. In an exemplary embodiment, a seal may act as an isolator to inhibit potential galvanic corrosion caused, e.g., by the chronic contact between dissimilar materials.

A sealant region may include features such as a groove, dovetail groove, inset or other feature built into a surface of the node. The sealant region may accept a sealant such as an O-Ring or gasket, and effectively define a border or perimeter of each adhesive region. The sealant region with the accepted sealant may ensure that the adhesive region around which the sealant borders is hermetically sealed such that contamination of the adhesive region by foreign or environmental agents is prevented. Further, the sealant region and/or adhesive region, discussed below, may be used as an isolator to prevent direct contact between the panel and node. Where, for example, the panel and node are composed of dissimilar metals, this isolation may be crucial to enable reliable, long-lasting node-panel connections.

The sealant region may be additively manufactured with the node itself. In an embodiment, these features include dovetail grooves for O-Rings. Numerous other types of sealant features and sealants may be used as alternatives to accomplish a similar objective. Additionally, the node may further incorporate adhesive injection port(s), vacuum port(s) or both. In certain embodiments, the ports may be recesses or holes instead of protrusions. The ports may also include protrusions built in surrounding holes, such that the tips of the protrusions may be flush with or proximate in height to the external surface of the node. In an exemplary embodiment, the holes may be tapped or threaded holes, which may advantageously result in weight savings. In embodiments utilizing protruding ports, the ports may be fabricated with the intent of being broken off upon completion of the bonding process, which may also reduce mass and volume. For purposes of this disclosure, the term "port" may be broadly construed to refer to a protrusion, or alternatively a recess or hole, and therefore would encompass any of the embodiments discussed above. A port is simply an entry point or exit point for a fluid or other substance. Examples of ports include adhesive inlet and outlet ports. In an embodiment, the adhesive outlet port may be a vacuum port. In other embodiments, an adhesive outlet port need not be a vacuum port but may, for example, be an exit point for excess adhesive.

The port may be coupled to a channel, which may lead to adhesive regions as described in embodiments below. The port may be an adhesive inlet port for injecting adhesive into the channel and towards the adhesive regions. The port may alternatively be a vacuum port for applying negative pressure to draw the adhesive towards the end of the channel to which the port is coupled. While the adhesive application process in this disclosure may include a combination of vacuum and adhesive application, the disclosure is not limited as such, and adhesive may in some exemplary embodiments be injected without use of negative pressure. In these cases, the positive pressure causing the adhesive flow may be sufficient to fill the adhesive regions.

The channel may be a part of the node and may be additively manufactured using any suitable AM technique. The channel may be characterized as broken off into channel portions after it enters and then exits an adhesive region, but may be part of the same channel. Depending on the embodiment and whether adhesive is injected serially or in parallel, the node may be considered to have one or more channels. In general, the design of the channels may enable sequential flow of the adhesive into specific adhesive regions between an inner surface of the node and an outer surface of a panel whose edge has been inserted into a recess of the node.

To better facilitate assembly, the node may be printed in two or more parts, with the two or more parts being fastened mechanically prior to adhesive injection. In an exemplary embodiment, the node may constitute a base structure with sides protruding from the base structure to define a recess for accepting a panel. In other embodiments, the node may constitute additional features, such as connection features to other structures or other structural or functional features that are not explicitly shown in the illustrations herein to avoid unduly obscuring the concepts of the disclosure and to focus on the node-panel interface aspect of the node. These additional features of the node may cause portions of the node to take a different shape or may add structures and geometrical features that are not present in the illustrations herein. These additional features and structures may be additively manufactured along with the remainder of the node, although this may not necessarily be the case, as in some applications, traditional manufacturing techniques such as casting or machining may be used.

Figure 4A:
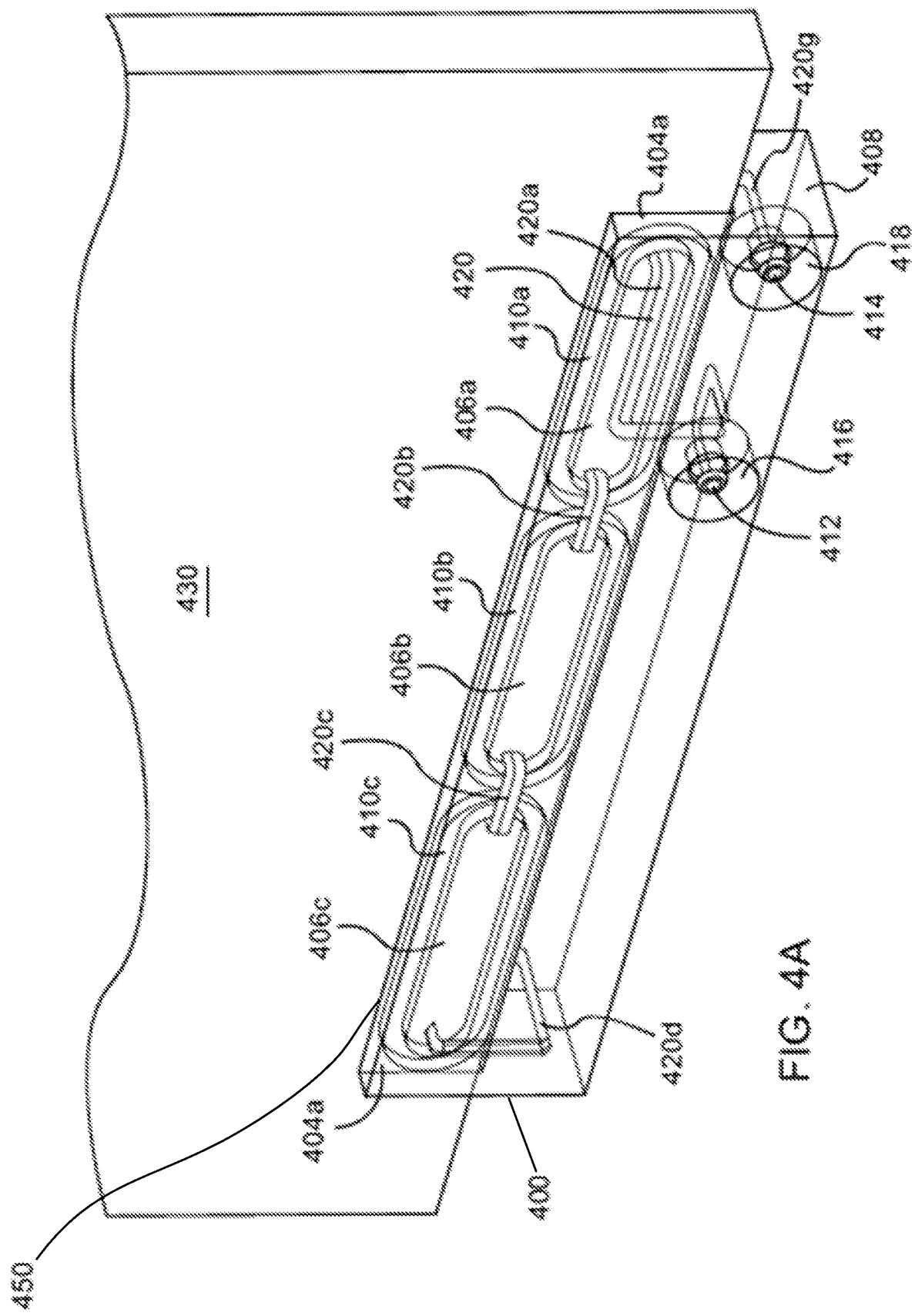
FIG. 4A is a perspective front view of a node to panel joint.
Figure 4B:
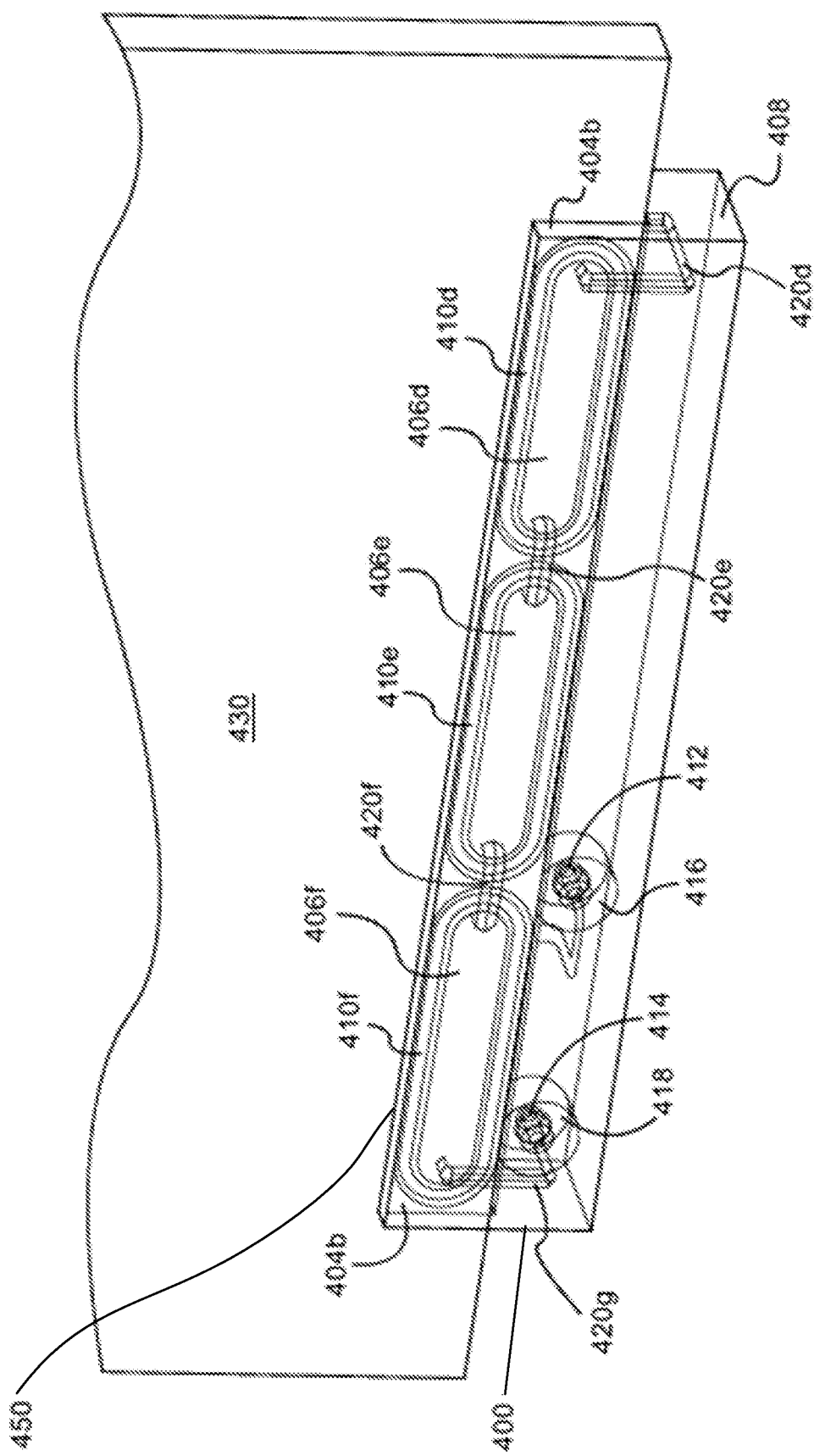
FIG. 4B is a perspective rear view of the node to panel joint.
Figure 4C:
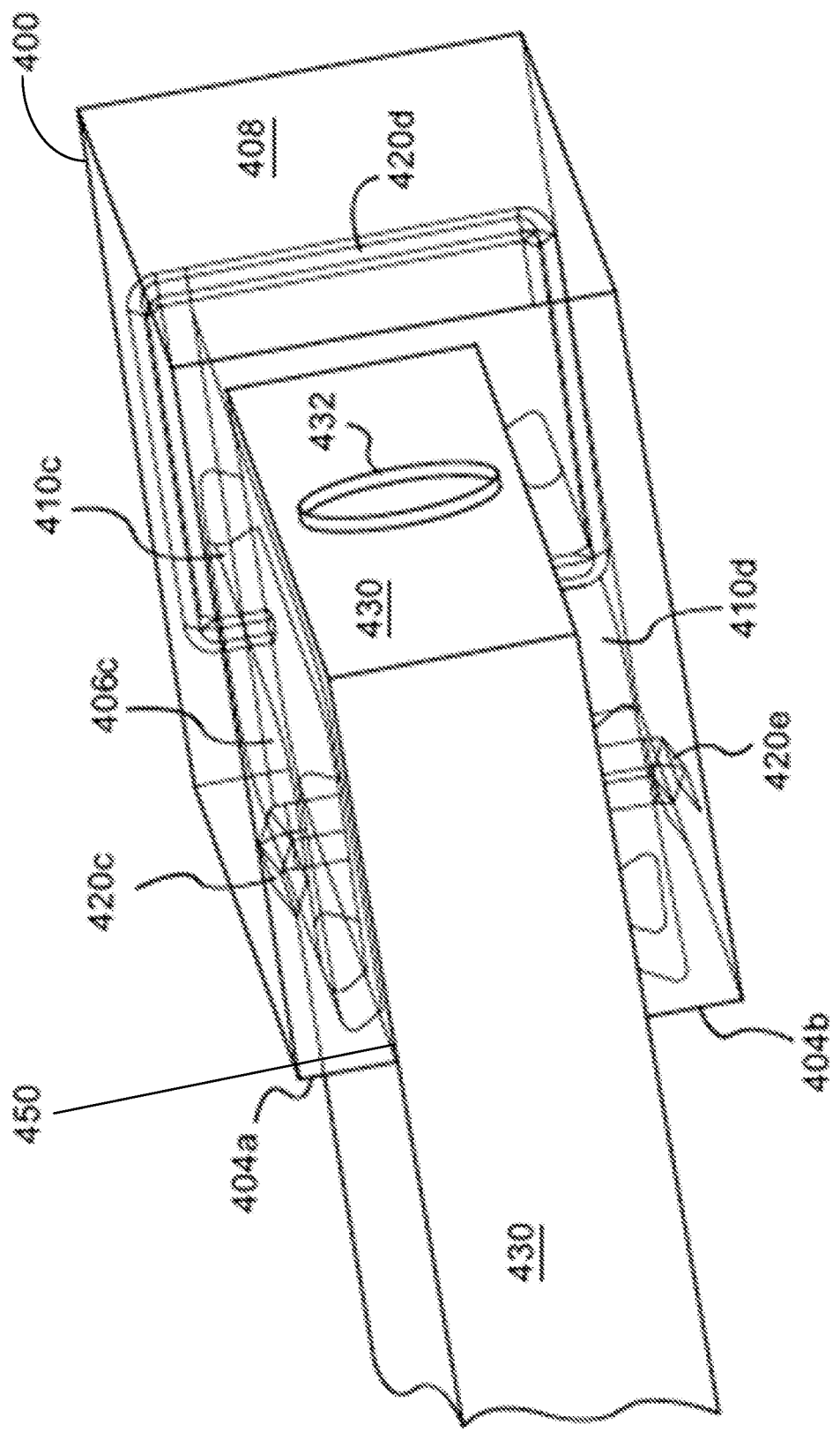
FIG. 4C is a perspective side view of the node to panel joint.

FIGS. 4A-C are front, rear, and side perspective views of a node-panel joint 450 in accordance with the disclosure. Shown is a node 400 coupled to a panel 430. In an exemplary embodiment, node 400 is additively manufactured. The node 400 may be constructed from a plastic, metal, alloy, or any suitable material or combination thereof. The panel 430 may be a simple, single material panel, a multi-layered panel a sandwiched panel (e.g., with a honeycomb or lattice structure arranged between face sheets), or another type of panel that may be full or hollow, or somewhere in between. The components in FIGS. 4A-C are made transparent for clarity, although they may or may not be partially or fully transparent in real world applications. The node 400 may have a base 400. First and second sides 404a and 404b of the node 400 are built to protrude from base 408 to thereby form a recess for accepting the panel 430, an edge of which can be inserted into the node recess as shown.

In an exemplary embodiment, the node-panel interface 450 may include a plurality of adhesive regions 406a-f for realizing the connection. In this embodiment, three adhesive regions are shown on each side. However, any number of adhesive regions 406 may be possible depending on factor such as the desired strength of the bond, the size and dimensions of the panel, the available room given the area within the transport structure in which the interface will be positioned, etc. In another embodiment, one side of the node 400 may have more or less adhesive regions than the other.

In still other embodiments, it may also be desirable to have additional rows of adhesive regions 406 on each side. The adhesive regions 406 may be dispersed in arbitrary ways or dispersed more evenly across the panel edge, if desired, for example to accommodate received forces more evenly. The adhesive regions 406 may also vary in size from very small to large, and in some cases, as large as the interface 450 will practically allow. In rendering these design decisions, considerations may include the size, weight and dimensions of the panel 430 and node 400, the application of the interface 450, the anticipated forces that will be experienced by the structures over time, and the like. The shape of the adhesive regions 406 is also embodiment-specific and may also vary widely. Larger or thicker panels may require connection to additional nodes in some transport structures.

In the embodiment shown, three of the six adhesive regions 406a-c are formed on a front side of the node 400 (FIG. 4A), and the remaining three adhesive regions 406d-f are on a rear side (FIG. 4B). The adhesive regions 406a-f may be located on an inner surface of each side 404a-b of the node adjacent a respective surface of the panel 430. Each adhesive region 406a-f is has a sealant region running around the periphery of the adhesive region. While obscured from view due to sealants 410a-f, the sealant region may each constitute one or more features for accepting a sealant. Such features can be built into the panel's inner surface and can include, grooves, edges, concave curves, convex curves, bumps, ridges or any suitable geometrical shape or other suitable set of features for accepting a sealant desired for use in the application. In another embodiment described with reference to FIGS. 8A-B below, a gasket may be inserted between the node and panel edge. The gasket may be used both as a sealant and an isolator, and it may be used to define the adhesive regions. In embodiments using gaskets, further sealant features (such as grooves) and sealants (such as liquid sealants or O-rings) may not be necessary since the gasket may already incorporate this functionality. In an alternative embodiment, the node-panel joint may constitute a hybrid in which both a gasket and another type of sealant may be used.

Figure 5:
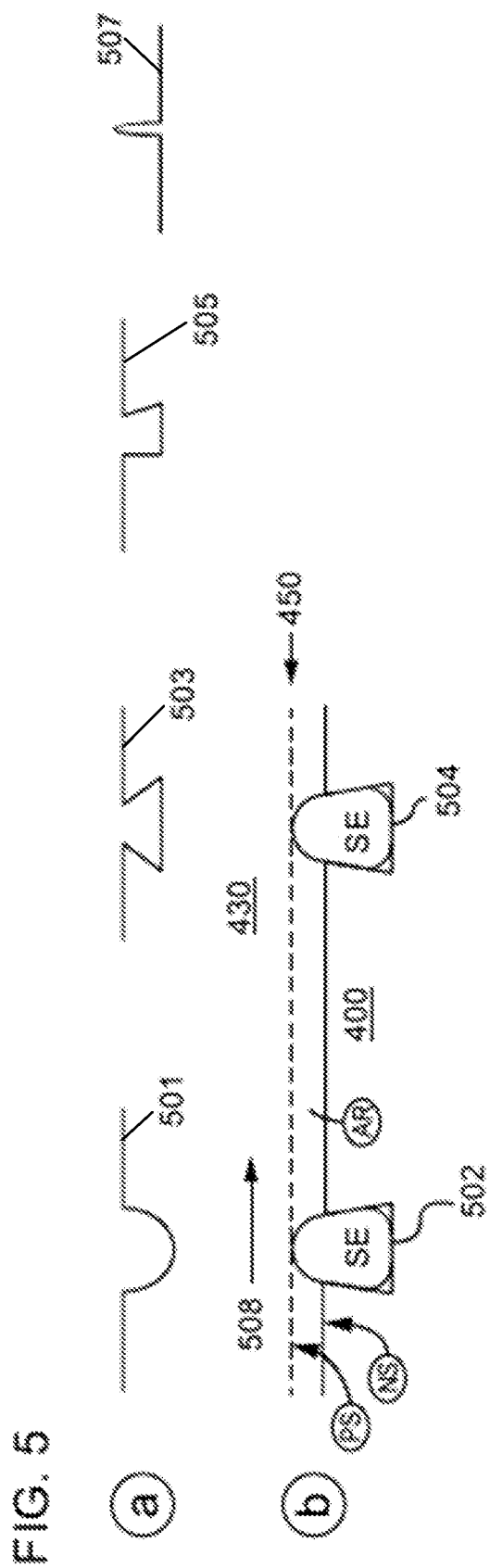
FIG. 5A is a cross-sectional view of exemplary sealant regions including different features for accepting a sealant.
FIG. 5B is a cross-sectional view of an exemplary adhesive region bordered by a sealant inserted into the sealant region.

FIG. 5A shows four different cross-sectional examples of a sealant region at a surface of node 400 including a different sealant feature. As noted above, the features in these sealant regions generally surround an adhesive region for accepting a sealant that will define the adhesive region. Element 501 shows that the sealant region includes a concave curve built into the surface of the node. Element 503 shows a dovetail groove in which, in an exemplary embodiment, an O-ring sealant may be inserted. Example 505 shows another exemplary groove where the left side is a vertical wall built down from the surface, and the right side is akin to the right side of a dovetail groove. Element 507 is a protrusion that may be used to accept a sealant. In some embodiments, the protrusion may be inserted in a recess in the node surface.

Each sealant region is generally constructed with at least one feature to accept a sealant. The sealant defines the adhesive region 406 more precisely by creating a seal between the node 400 and panel 430 surfaces that encloses a region to be filled with the adhesive. While the sealant defines the adhesive region, it should be noted that in some instances a small amount of adhesive will get into a portion of one of the grooves and technically beyond the adhesive region; however, this effect is generally negligible if a good seal design is provided. While FIG. 5A shows four exemplary features used for the sealant region, numerous alternative feature geometries are possible and are intended to fall within the scope of the present disclosure. For example, each side of the node 400 and hence the interface may include anywhere from a single adhesive region to a matrix of adhesive regions, and even to evenly or arbitrarily dispersed adhesive regions. In these cases, the appropriate channels and channel portions may be realized for each adhesive region, and whatever the design, there should be adequate pressure and/or negative pressure to populate each adhesive region with an appropriate amount of adhesive, e.g., a full adhesive region. Similarly, depending on the number of channels servicing a given adhesive region (which may be one), there may be one or more apertures on each side of the adhesive region. In some exemplary embodiments, the channel portions may run vertically and the adhesive regions may be elongated in the vertical direction. In these embodiments, the opposing adhesives may be vertically disposed in each adhesive region to fill the channel with adhesive in a vertical fashion. Diagonal adhesive regions and channel portions, with appropriately aligned diagonal apertures, may also be contemplated in some embodiments.

FIG. 5B is a cross-sectional view of an exemplary adhesive region bordered by a sealant inserted into the sealant region. The arrow 450 defines the demarcation between the node-panel interface. The dashed line represents one of panel surfaces designated by the encircled letters PS. The solid line represents the corresponding node surface identified by the encircled letters NS. Additively manufactured or otherwise built into the node surface NS is a groove similar to groove 503 in FIG. 5B. While two grooves 502, 504 are present, this in actuality represents a single groove due to the cross-sectional nature of the figure. That is, grooves 502, 504 protrude from and into a plane of the paper to form a region, such as an elliptical or rectangular region, to form a perimeter of the adhesive region 406, also designated as the encircled AR.

After the node 400 has been additively manufactured or otherwise built, a sealant may be applied to or inserted into the sealant region 502, 504. The sealant in this figure is designated by $S_E$ and, similar to the sealant region 502, 504, the sealant may be a single sealant (depending on the sealant used) and may protrude from and into the plane of the illustration to form a perimeter around the adhesive region 406. As noted, a large number of sealants may be available and may be suitable for use in different embodiments. Some sealants are initially injected as fluids and then cure or otherwise harden. Other sealants have a pre-defined shape and may be deformable. In an exemplary embodiment, Sealant $S_E$ constitutes an O-ring that is inserted into an elliptically-shaped sealant region to form a corresponding elliptically shaped adhesive region 406. Sealant S$_E$ may alternatively constitute a liquid sealant that is inserted into the groove. The liquid sealant may harden in an embodiment to constitute a definite shape.

Sealants may be used to retard flow of the adhesive beyond the corresponding adhesive region. In another exemplary embodiment, sealants are additionally used to hermetically seal the corresponding adhesive region prior to adhesive injection to enable a clean and sterile region for adhesive injection. In yet another embodiment, sealants may similarly be used hermetically seal the corresponding adhesive region after the adhesive is cured in order to keep the adhesive region free from the effects of its environment. This helps ensure reduce or diminish potential damage or corrosion over time caused by various pollutants or contaminants. In still another exemplary embodiment, sealants may help inhibit galvanic corrosion that may otherwise be produced by contact between the surface of the panel and the node surface over time, where the two structures include dissimilar materials.

Referring back to FIG. 4A, port 412 may be coupled to channel portion 420a. Channel portion 420a may constitute a portion of a larger channel 420, which may include the sum of the channel portions and intermediary elements (e.g., adhesive regions 406a-f) through one or both sides 404a and 404b of the node 400. In an embodiment, channel portion 420a may be a passageway built in the additive manufacturing process that leads from port 412 and is routed to the far right side of the adhesive region 406a in FIG. 4A. Channel portion 420a may then enter into the far right side of the adhesive region 406a via an aperture (obscured from view). In an embodiment, channel portion 420a is elevated relative to an inner surface of sealant region 410a. A first structure being "elevated" over a second structure as used herein means that the first structure is farther from an inner flat surface of side 404a (or 404b) than the second structure. In this embodiment, the inner surface of sealant region 410a is defined by the greatest vertical depth that the features of the sealant regions 410a protrude into the side 404a of the node from the inner flat surface of the side 404a in a direction orthogonal to the side 404a towards the peak of the feature(s). That is, in this embodiment, channel portion 420a is built farther into the inner surface of side 404a than the greatest depth of the features of sealant region 410a. Often, the greatest depth of the features of a sealant region may constitute the bottom of the feature, such as the lowest point or portion of elements 501, 503, 505, and 507 of FIG. 5A (below). This enables channel portion 420a to be routed across or over sealant region 410a and into adhesive region 406a via the aperture without disturbing sealant region 410a. This in turn enables channel portion 420a to contact the adhesive region 406a via the aperture without disrupting the seal formed by the sealant. As will be seen, in an embodiment, adhesive can then flow via port 412, through channel portion 420a and into adhesive region 406a on side 404a of node 400 without touching the sealant or disturbing the seal.

The channel 420 may have any number of cross-sectional shapes conducive to providing adhesive or pressure flows. In an embodiment, the channel 420 may be circular or tear dropped, or may have another shape that advantageously reduces or eliminates the need for support material during the AM process.

At the left opposite end of seal region 406a is another aperture, similarly obscured from view, which is connected to channel portion 420b. Channel portion 420b, also part of channel 420, is built from the left aperture of adhesive region 406a to a first aperture positioned on the right of the next adhesive region 406b. Like 420a, channel portion 420b is elevated over adhesive regions 406a and 406b to avoid disturbing the seals caused by the sealants while allowing adhesive to flow.

As will be seen, in an embodiment, each of adhesive regions 406a-f may have an aperture on one side and an opposite aperture on another side. Opposite does not require precisely opposite for the purposes of this disclosure. Rather, apertures on opposite sides simply mean that the apertures are adequately positioned to allow adhesive flow from one side of the adhesive region to the other. It should also be noted that in alternative embodiments, more than one aperture may be used. For example, in an embodiment, channel portion 420a may be further segmented into two channel portions, each of which contact adhesive region via an aperture on one side of the adhesive region. On the other side of the adhesive region, two apertures opposite the right apertures may lead to two additional channel portions, and so on. This embodiment is contemplated within the structure herein.

An opposite aperture is positioned on a left side of adhesive region 406b, which leads to channel portion 420c (also part of channel 420). In a manner similar to channel portion 420b, channel portion 420c is elevated relative to sealant regions 410b and 410c and leads to a right aperture in adhesive region 406c. At an opposite, left aperture in adhesive region 406c, channel 420d is routed downward toward the posterior of base 408. Channel 420d is also elevated in this embodiment over sealant region 410c. In this case, channel 420d is then routed across the base 408 to the second side 404b of the node. Channel 420d may be considered a transfer channel because it serves as a pathway to transfer a substance, e.g., to enable the flow of adhesive, from one side of the node to the other.

Referring now to FIG. 4B, the opposite side of the node-panel interface 450 is shown. On the right, channel 420d is built to change direction and pass over or across sealant region 410d into a right aperture (or in other embodiments, more than one aperture) associated with adhesive region 406d. As before, in the embodiment shown, channel portions 420d, 420e, and 420f are each elevated relative to the applicable sealant regions 410d-f in a manner similar to the that discussed with reference to FIG. 4A, except using flat inner surface of side 404b as a reference. An opposite aperture (or set thereof) disposed on an opposite left of adhesive region 406d is coupled to channel portion 420e, which is elevated relative to adhesive regions 410d-e and is routed to a first aperture at the right of adhesive region 410e. A left opposite aperture of adhesive region 410e is an entryway to adhesive region 406f via a channel portion 420f which is elevated relative to sealant regions 410e-f, and which contacts a right aperture on adhesive region 406f An opposite, left aperture in adhesive region 406f is coupled to channel portion 420g which is elevated relative to sealant region 410f Channel portion 420g travels vertically toward the base 408, across to the other side of node 400 and to port 414.

In an exemplary embodiment, the node is additively manufactured. A panel is received, or manufactured using additive manufacturing or a conventional technique such as molding, casting machining etc., or some combination thereof. Sealants such as gaskets or O-rings are inserted into respective sealant regions 410a-410f In an embodiment, this process is performed automatically by a robot or other automated constructor, optionally under the control of a central control station. To this end, a vector 508 may specify a direction of installation of the sealants (see FIG. 5B). In other embodiments, the process of inserting sealants is performed manually. The panel is accepted into the panel recess between node sides 404a and 404b. Again, the panel insertion process may be automated and, in some embodiments, controlled by the same central control station.

Thereupon, in an embodiment, the panel is bonded to the node as follows. An adhesive source may be applied to port 412 and a negative pressure (vacuum) source may be applied to port 414, which negative pressure will propagate through the channels and adhesive regions via the sets of opposing apertures, but in an opposite sequence than the one described above. Negative pressure may first be applied which assists in creating near vacuum conditions first through transfer channel 420g to side 404b of node 400, then through the sequential channel portions and adhesive regions on side 404b, and then back to side 404a of node 400, through sequential channel portions and adhesive regions via sets of opposing apertures, until negative pressure propagates through channel portion 420a and is present at port 412.

Referring back to FIG. 4A, adhesive may then be inserted via port 412, and may propagate through channel portion 420a through a corresponding aperture on the right of adhesive region 406a. Adhesive will begin to fill up adhesive region 406a until adhesive region is full or substantially full, whereupon (or prior to adhesive region 406a becoming full) adhesive exits through the opposite aperture of adhesive region 406a and through channel portion 420b, where the process may repeat as adhesive fills adhesive region 406b, then 406c. Thereupon, the adhesive may pass through the left opposite aperture of adhesive region 406c, through transfer channel portion 420d, and to the other side 404b of node 400.

Referring back to FIG. 4B, the process may continue as adhesive enters via the right aperture of adhesive region 406d, exits the opposite aperture upon filling the adhesive region 406d, and continuing its process to fill the remaining adhesive regions 410e and 410f. In this case, the adhesive may flow through channel 420g up to port 414. Once adhesive is detected at port 414, it is known that the adhesive regions 406a-f are filled and thus adhesive flow (and any negative pressure) may terminate. The adhesive may then be allowed to cure, via the application of heat, e.g., in a chamber, or time, as appropriate. Once the adhesive cures, a connection is realized between the node and the panel.

As noted above, other embodiments may contemplate the parallel flow of adhesive via a plurality of channels into and out of adhesive regions via multiple apertures. In alternative embodiments involving a plurality of rows of adhesive regions, or dispersed adhesive regions, the parallel channels may each flow down one row and then sequentially transfer to the other side. In short, variable numbers of channels, with or without additional ports and additional apertures in the adhesive region beyond the two entryway and exit apertures, may be implemented without departing from the scope of the invention.

As noted above, transfer channels 420d and 420g may serve as pathways to enable the adhesive to flow from one side of the node to the other. These apertures described above may be holes, and as noted may be designed to not require any support material during the additive manufacturing process, e.g. channels with tear-drop shape cross-sections. Regardless of the number and position of adhesive regions, vacuum may draw adhesive into each contiguous region until the adhesive channels are all full. In an embodiment, only adhesive inlet port is used and negative pressure is not applied. The adhesive would flow out of the adhesive outlet port.

Referring now to FIG. 4C, to prevent the contact between the inner surface of the node and the panel, features to accept isolators may be additively manufactured or otherwise included within the node. In an embodiment, the feature may be a recess 432 to accept a nylon isolator such as a washer. While only one recess for an isolator is explicitly shown, the panel may include any number of such features, on the inner surface of the node or in other places where prevention of galvanic corrosion is desired.

Referring back to FIGS. 4A-C, the node 400 may have sealant features 410a-f to accept isolators between the surfaces of the node and panel cooperating to form the adhesive bond. O-Rings, for example, in addition to serving as sealants, may ensure a hermetically sealed environment for the adhesive in the respective adhesive regions 406a-f. The bond would be formed between the surfaces of the node and the panel as described above.

In another exemplary embodiment, the patches of surfaces not bonded with the node may be separated by a gasket or other isolating mechanism to provide further isolation to prevent potential galvanic corrosion issues. In another embodiment, the isolating material may integrate both parallel surfaces as well as the bottom surface instead of the nylon washer described with reference to FIG. 4C, above. In these alternative embodiments involving an integrated isolator, the integrated isolator may function as a seal as well. The seal may be a custom-made gasket, and may be additively manufactured.

Figure 6A:
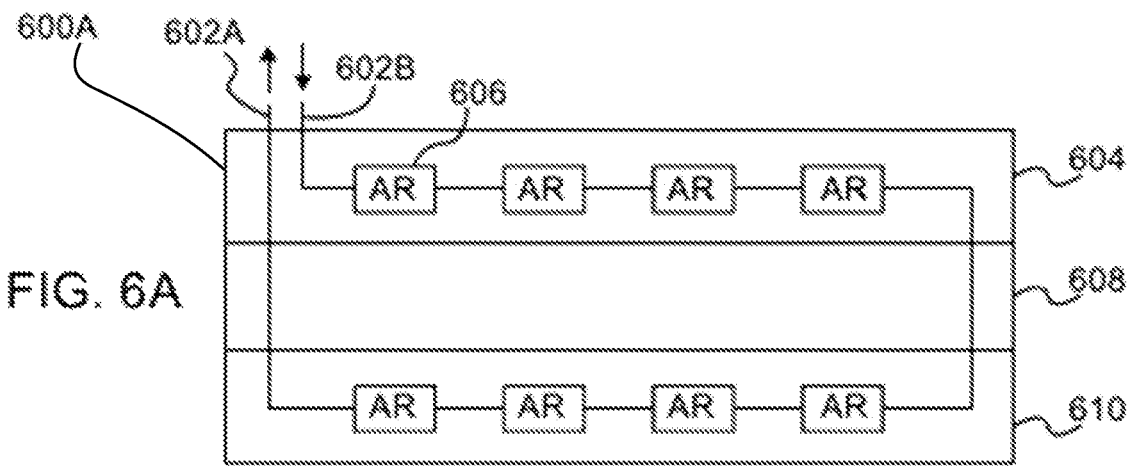
FIGS. 6A-C are conceptual block diagrams of alternative exemplary connections in a node to panel joint.
Figure 6B:
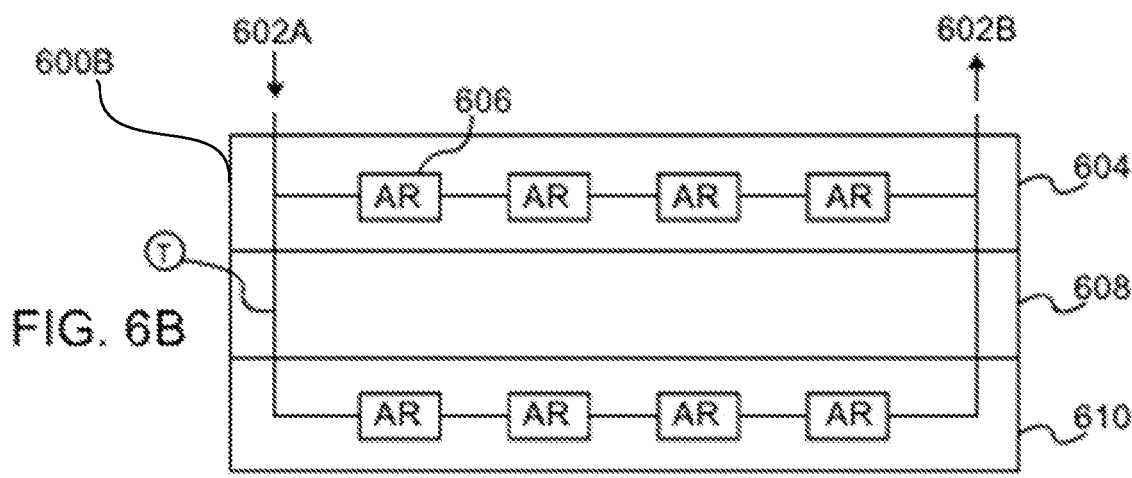
Figure 6C:
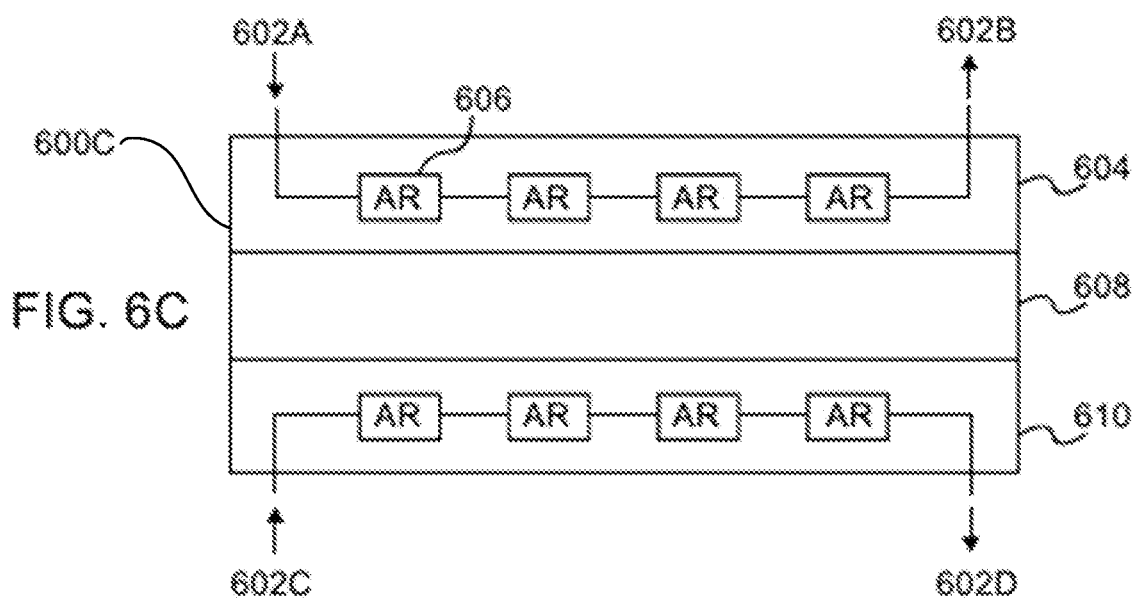

FIGS. 6A-C are conceptual block diagrams of alternative exemplary connections in a node to panel joint. As an alternative to filling the adhesive in a purely sequential or serial fashion in the sequence 406a, 406b, 406c, 406d, 406e, 406f, alternative parallel mechanisms may be used. FIG. 6A shows a conceptual view of node 600A having base 608, and sides 604 and 610. Node 600A has eight adhesive regions 606 ("AR") in this embodiment, four on side 604 and four on side 610. Further, node 600A has two ports 602A-B. A serial or sequential adhesive-filing process is discussed with reference to FIG. 6A. Port 602A represents a vacuum port in which vacuum may be drawn. In other embodiments, vacuum is not used and only pressure from adhesive injection is relied on to fill the adhesive regions. Ports 602A-B may also be holes, recesses, protrusions, protrusions within recesses, and the like.

Node 600A has a configuration otherwise similar to that of FIGS. 4A-C. The adhesive regions 606 are bounded by sealant regions including sealants and include two apertures, an opposite one on each side. As noted above having the apertures on "opposite" or "opposing" sides does not require precision placement of the apertures such that they are equidistant from a half-way point separating the two. Nor does it require that opposite or opposing apertures be perfectly aligned in any dimension. Rather, "opposite" or "opposing" apertures are apertures that are distributed sufficiently apart such that the flow of adhesive in the respective adhesive region allows for filling, or approximate filling, of the adhesive in that adhesive region. More than two apertures per adhesive region may be used in some embodiments. While a single channel is shown with multiple portions, in other embodiments a plurality of channels may be used, such as when the case where there are multiple rows of adhesive region 606 or otherwise a larger amount of adhesive regions 606. The multiple channels may use these multiple apertures, or they may branch out and supply adhesive to different adhesive regions.

A panel may be inserted in the recess defined by sides 604 and 610, and base 608. The panel need not be a planar panel. In some embodiments, the panel can be curved or oriented in a different manner as it sticks out of the interface. Further, to avoid unduly obscuring the illustration, the vacuum and adhesive mechanisms are not included in the illustration.

The processes described below may be automated, e.g., by using one or more robots with self-learning capability, or controlled by a central station (or both). The robots may be specialized for the manufacturing application at issue, or they may be general purpose robots. The robots may participate in any part or substantially all of the panel-node assembly process. In some embodiments, the robots are used for one or more tasks including to transport the panels, transport the nodes to and from an AM station, insert the panels into the node recess, apply sealant, apply adhesive, and/or assist with any post-processing steps including curing and carrying the completed product to the next station. In other embodiments, the processes may involve manpower in whole or in part. The node-panel assembly may be performed on an automated assembly line. For instance, if the node-panel interface is to be configured for use as part of the chassis of an automobile or the fuselage of an aircraft, the node-panel interface may be assembled at a station in an assembly line dedicated to those kind of tasks.

Referring back to FIG. 6A, upon insertion of a panel, sealants, and any necessary isolators, negative pressure may be applied at port 602A, during or after which an adhesive may be applied at port 602B. The adhesive flows to the first adhesive region 606, fills the region, then proceeds to fill the remaining adhesive regions on side 604. The adhesive is then transferred to the other side 610 of the node, where it sequentially or serially fills the four adhesive regions on side 610. Thereafter, the excess adhesive may exit out of port 602A. The presence of adhesive at port 602A may be an indication that the adhesive-filling process is complete. The node-panel interface may then be cured to allow drying of the adhesive.

FIG. 6B shows a parallel configuration for the application of an adhesive. Vacuum may be drawn at port vacuum port 602B. An adhesive may be injected at inlet port 602A. Adhesive may split between sides 604 and 610 to concurrently populate the four adhesive regions on each side. That is, adhesive flows in parallel on each side, and serially within a side, to fill the four adhesive regions 606. Because it may take more time for the adhesive at the input to cross the transfer channel T, the process may not be exactly simultaneous on each side. Nevertheless, the in-parallel fill of the adhesive regions 606 may speed up the adhesive application process in this parallel channel embodiment.

Numerous other configurations of the adhesive/vacuum channels are possible and are within the scope of the disclosure. In FIG. 6C, adhesive regions are independently filled using separate channels defined by ports 602A and 602B for side 604, and 602C and 602D for side 610. The adhesive regions 606 on one side may be filled first using the adhesive injection equipment, or both sides may be filled in parallel if additional adhesive/vacuum is available.

In an exemplary embodiment, where ports 602A-D in any of FIGS. 6A-C are protrusions, they may be broken off after they are no longer needed to reduce mass, volume and bulkiness of the interfaces. Where ports 602A-D are holes or are protrusions in recesses and flush with the surface of the node, they need not be broken off.

In FIGS. 6A-C, the number of channels may, but need not, be the same as the number of ports. In an exemplary embodiment, the number of channels is doubled or tripled from a single port and routed to intended destinations, such as different rows of adhesive regions.

Figure 7:
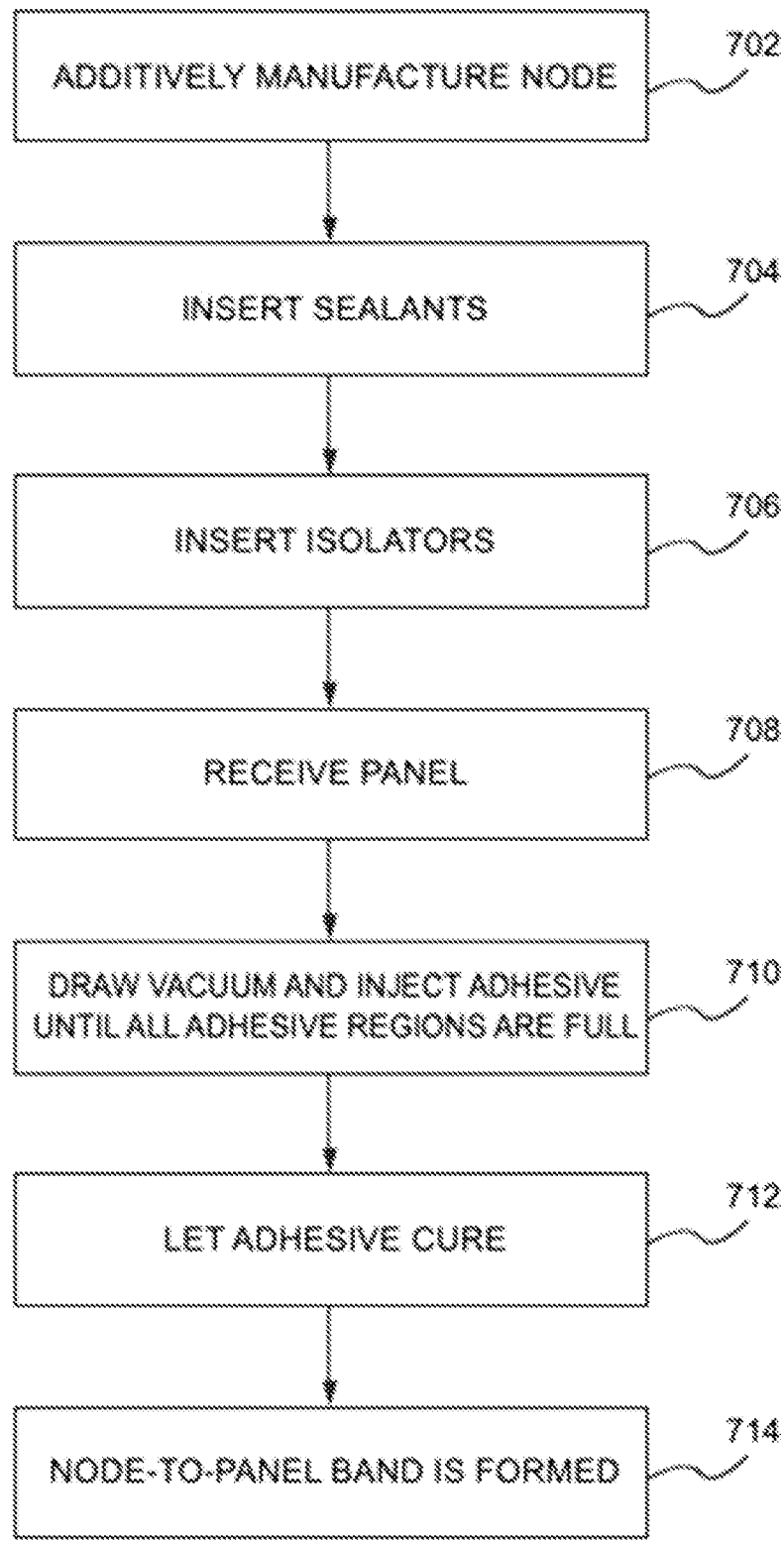
FIG. 7 is a flow diagram of an exemplary method of additively manufacturing a node to panel joint.

FIG. 7 is a flow diagram 700 of an exemplary method of additively manufacturing a node to panel joint. A node may be additively manufactured (702). The node may be made of plastic, one or more metals, an alloy, a composite, or the like. The type of material may influence the AM method selected to manufacture the node. During the AM process, a base, both sides, sealant regions, isolator regions, channels and ports may be 3-D printed. In an embodiment, the node is printed in two sides using two renderings.

In addition to the features described in this disclosure, the node may be additively manufactured to incorporate additional features. These additional features may include, for example, connection features for enabling the node-panel joint to connect to another structure, such as another node, panel, extrusion, tube, etc. In an exemplary embodiment, the node as described herein is a portion of a larger node or a larger structure that has various geometrical features and functions. In another embodiment, the node may be manufactured with a panel recess on the other side to receive another panel.

Sealants then may be inserted in the sealant regions (704). Isolators may also be inserted (706). A panel may then be received in the panel recess (708). The panel may be obtained from a supplier or manufactured. The panel may be conventionally manufactured or additively manufactured. In an embodiment, the panel is a sandwich panel. The panel may be made of any appropriate material depending on the application for which the node-panel interface is intended. The size of the panel may vary. In some embodiments, the node may be manufactured to accept more than one panel contiguously placed in the panel recess. The panel may constitute a single material.

After the panel is received, vacuum may be drawn and adhesive injected to fill the adhesive regions as described herein (710). The vacuum may be held throughout the adhesive injection process, and may be disconnected once a complete fill is realized. Once the adhesive regions are filled with the adhesive and the adhesive injection process is complete ports (if necessary or desired) may be broken off. The adhesive may then be allowed to cure (712). Once the adhesive hardens, the node-to panel bond is formed (714). Depending on the application and destination of the channel, the panel may then be implemented as part of the transport structure.

In various embodiments, a single node may connect to two or multiple panels in a structure using the features described above. The node may also be extended, elongated, or shaped in any way to enable multiple sets of interface regions (i.e., sets of one or more adhesive regions with sealants and channels as described above to realize a connection) to exist on a single node. For example, in one embodiment, the node is rectangular, with separate interfaces on two or more sides of the rectangular node connecting to different panels via the adhesive process and techniques described above. In other embodiments, nodes may be constructed to have interface regions in close proximity so that two respective panels may be spaced very closely, or so that the panels may make contact. Numerous embodiments of the node, the node-panel joint and the panel may be contemplated based on the above description and attendant illustrations without departing from the spirit and scope of the disclosure.

Figure 8A:
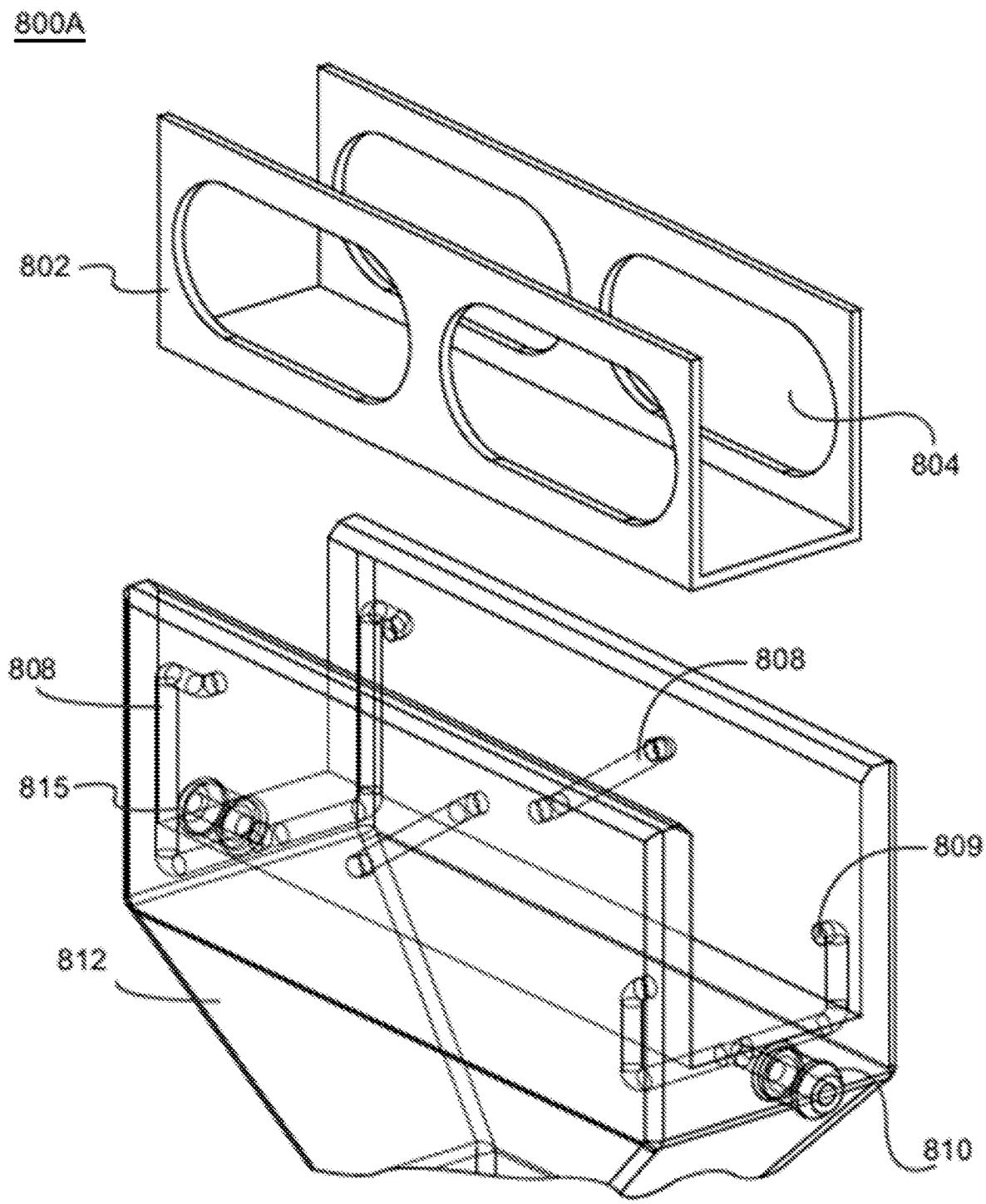
FIGS. 8A-B are perspective views of a gasket used in a node.

FIG. 8A is a perspective view 800A of a gasket 802 to be used as an isolator and a sealant for insertion into the inner surface of the node 812 according to an embodiment. In other embodiments, gasket 802 may be applied to the panel instead of the node. In embodiments where the gasket 802 is applied to the panel, the gasket should be applied prior to the panel-gasket's insertion into the node to ensure proper operation. As shown in FIG. 8A, the inner surface of the node may include channel portions 808, closely related apertures 809 terminating at an end of the channel portions 808, adhesive inlet port 810 and adhesive outlet port 815. The node 812 may have a sealant feature or interface to accept or house the gasket, which in this embodiment is accomplished by the walls of inner portions of node 812 in FIG. 8A. It should be noted that node 812, like in previous figures is transparent to show the construction of the inner channel portions. In other embodiments it may be either opaque, transparent, or somewhere between.

Figure 8B:
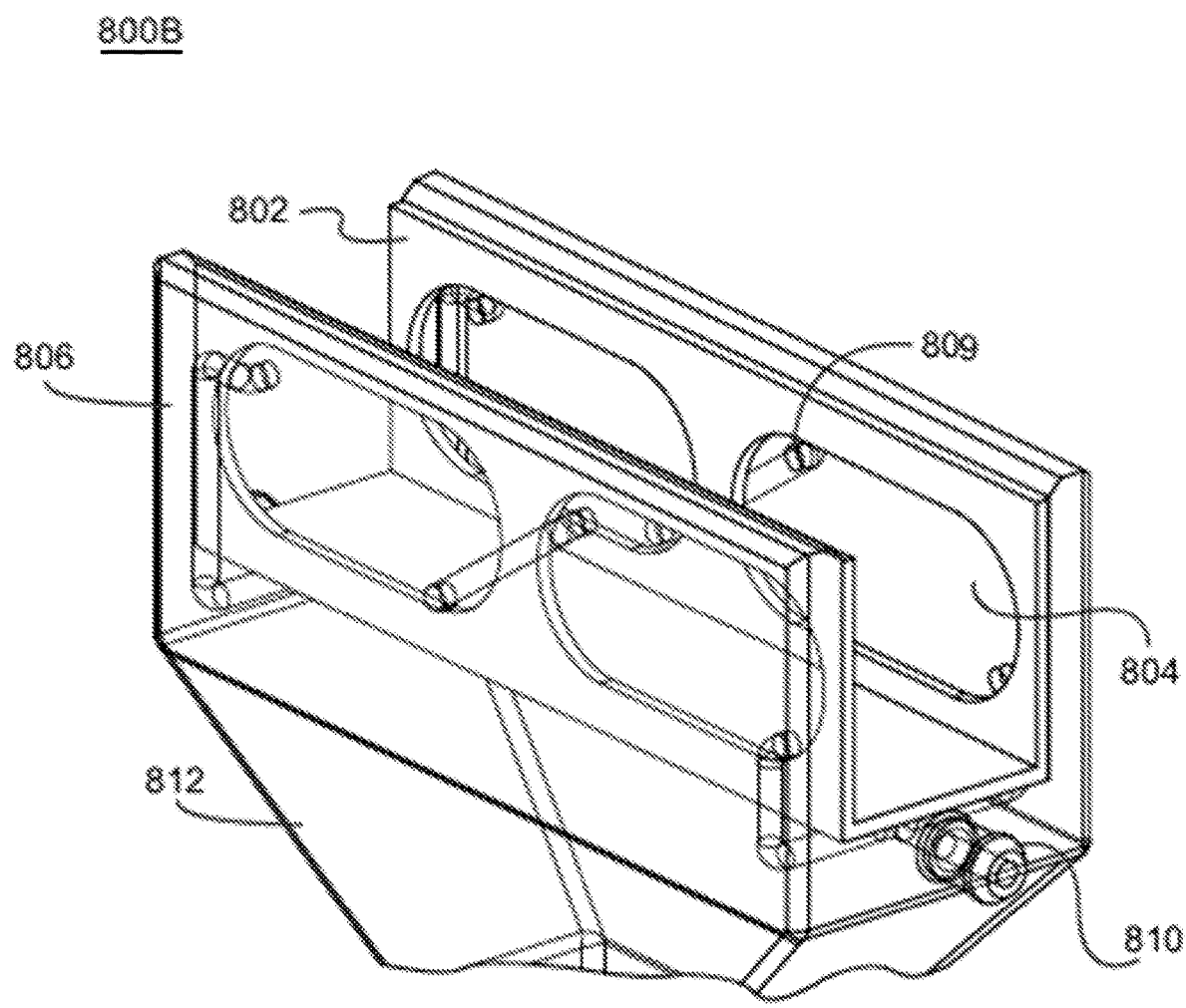

Referring to the perspective view 800B of FIG. 8B, the gasket 802 may be slipped into the node 812, by a robot or manually. The gasket 802 may be designed to align its respective adhesive regions 804 with the channel portions 808 and apertures 809 on the node 812. In this embodiment, it can be seen that the apertures 809 are offset with respect to each other in a diagonal way within an aligned adhesive region 804, rather than horizontally as in previous embodiments. An adhesive may be introduced into adhesive inlet port 810 to fill the two adhesive regions 804 on each respective side in parallel, after which it may exit adhesive outlet port 815. In some embodiments, adhesive outlet port 815 may be a vacuum port.

As noted, the gasket 812 may serve as both a sealant for defining the adhesive region and an isolator. The base of the node 812 may also interact with the gasket 804, as depicted in this embodiment.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A node comprising:
   a base;
   first and second sides protruding from the base to form a recess for receiving a panel;
   first and second ports;
   one or more adhesive regions disposed on a surface of each side adjacent the panel; and
   at least one channel coupled between the first and second ports and configured to fill the adhesive regions with an adhesive, the adhesive being cured to form a node-panel joint, wherein:
   the first side comprises n=N adhesive regions;
   each of the N adhesive regions comprises at least two apertures including at least one aperture disposed on an opposite side of at least one other aperture;
   (a) the first port being coupled to an (n=1) channel portion on the first side;
   (b) the (n=1) channel portion is coupled to a first aperture of an (n=1) adhesive region on the first side; and
   (c) a second aperture of the (n=1) adhesive region is coupled to an (n+1=2) channel portion on the first side.

2. The node of claim 1, wherein the channel runs serially from the first port to the second port through each adhesive region on the first and second sides by using apertures arranged on opposing sides of each adhesive region as respective entry and exit areas for the adhesive.

3. The node of claim 2, wherein the channel is configured to enable transmission of the adhesive in parallel through each adhesive region on the respective first and second sides.

4. The node of claim 2, wherein the channel is configured to enable transmission of the adhesive serially through each adhesive region on the first side, through the base, and then serially through each adhesive region on the second side.

5. The node of claim 1, wherein at least the base, the first and second sides, the first and second ports, and the at least one channel are additively manufactured (AM).

6. The node of claim 5, wherein at least portions of the channel comprise geometries conducive to additively manufacturing the at least one channel without use of support structures during the AM.

7. The node of claim 1, wherein at least the base, the first and second sides, the first and second ports, and the at least one channel are co-printed.

8. The node of claim 1, wherein each of the one or more adhesive regions is bounded by a sealant region configured to accept a sealant.

9. The node of claim 8, wherein the sealant region comprises the sealant.

10. The node of claim 9, wherein the sealant is configured to configured to perform one or more following functions:
    (i) retard flow of the adhesive beyond the corresponding adhesive region;
    (ii) hermetically seal the corresponding adhesive region prior to adhesive injection;
    (iii) hermetically seal the corresponding adhesive region after the adhesive is cured; and
    (iv) inhibit galvanic corrosion between dissimilar materials.

11. The node of claim 9, wherein the sealant comprises an O-ring, a gasket, or a liquid sealant.

12. The node of claim 9, wherein the sealant is robotically applied to each corresponding sealant region.

13. The node of claim 9, wherein at least portions of the channel extending across the first or second sides are elevated relative to an inner surface of the one or more sealant regions to enable the channel portions to contact the adhesive regions via the apertures without disrupting the seal formed by the sealant.

14. The node of claim 1, further comprising at least one isolation feature disposed on at least one of the first side, the second side, and an inner surface of the base, to prevent contact of the node with the panel upon installation of an isolator in the isolation feature.

15. The node of claim 1, wherein the first or second sides further comprise one or more gaskets configured to prevent galvanic corrosion.

16. The node of claim 1, wherein
the channel runs from the first port serially through each adhesive region on the first side, through the base, and through each adhesive region on the second side, and then to the second port, and
the channel is configured to fill each adhesive region to create a bond with the panel when the adhesive is cured.

17. The node of claim 16, wherein the second port is disposed on the first side, such that, after routing through each of the one or more adhesive regions on the second side, the channel is routed via the base back to the first side.

18. The node of claim 1, wherein
the channel runs from the first port to the second side via the base, serially through each adhesive region on the second side, back to the first side via the base, and serially through each adhesive region on the first side, whereafter the channel is coupled to the second port.

19. The node of claim 1, wherein application of negative pressure at the second port and subsequent application of the adhesive at the first port progressively fill the one or more adhesive regions with the adhesive when a panel is inserted.

20. The node of claim 1, wherein the channel portions contact the one or more adhesive regions via an aperture at an angle.

21. The node of claim 1, wherein:
(b)-(c) continue for ($n=2, 3 \ldots N$) until, at (c), the second aperture of the $N^{th}$ adhesive region is coupled to an $(N+1)^{th}$ channel portion on the first side.

22. The node of claim 21, wherein:
the $(N+1)^{th}$ channel portion is routed through the base to the second side to become an ($m=1$) channel portion on the second side;
the second side comprises $m=M$ adhesive regions;
each of the M adhesive regions comprises at least two apertures including at least one aperture on an opposite side of at least one other aperture;
(f) the ($m=1$) channel portion on the second side is coupled to a first aperture of a ($m=1$) adhesive region on the second side;
(g) a second aperture of the first ($m=1$) adhesive region on the second side is coupled to a ($m+1=2$) channel portion on the second side; and
(f)-(g) continue for ($m=2, 3 \ldots M$) until, at (g), the second aperture of the $M^{th}$ adhesive region is coupled to an $(M+1)^{th}$ channel portion on the second side.

23. The node of claim 22, wherein
the adhesive regions on the first and second sides are configured to receive the adhesive via the first port; and
the $(M+1)^{th}$ channel portion is coupled to the second port.

24. The node of claim 22, wherein $N=M$.

25. The node of claim 1, wherein the first port comprises a protrusion or a recess, or a protrusion at least partially inside a recess to allow an end of the protrusion to be proximate to or flush with a surface of the first side.

26. The node of claim 1, wherein at least one of the first and second ports is configured to be broken off after the adhesive is cured.

* * * * *